United States Patent [19]

Carlsson et al.

[11] Patent Number: 4,659,574
[45] Date of Patent: Apr. 21, 1987

[54] METHOD OF PROCESSING MUSSLES

[75] Inventors: Lars G. Carlsson, Göteborg; Sven A. Lundvall, Eklandagatan 23A, S-412 82 Göteborg, both of Sweden

[73] Assignee: Sven Albert Lundvall, Goteborg, Sweden

[21] Appl. No.: 805,582

[22] Filed: Dec. 6, 1985

Related U.S. Application Data

[63] Continuation of Ser. No. 491,975, May 5, 1983, abandoned.

[30] Foreign Application Priority Data

May 10, 1982 [SE] Sweden ................................ 8202913

[51] Int. Cl.$^4$ ............................................. A23L 1/333
[52] U.S. Cl. ..................................... 426/68; 426/524; 426/506; 426/509; 426/643; 99/646 C
[58] Field of Search .................. 426/643, 2, 520, 506, 426/524, 509, 92, 479, 523, 302, 68

[56] References Cited

U.S. PATENT DOCUMENTS 1,940,353  9/1929  Jenkins ................................ 426/524
2,093,069  9/1937  Bedford ............................... 426/643
2,824,004  2/1958  Seal ......................................... 426/2

FOREIGN PATENT DOCUMENTS 1692224  3/1967  Fed. Rep. of Germany .
79069175  8/1979  Sweden .

Primary Examiner—Raymond N. Jones
Assistant Examiner—Marianne M. Cintins
Attorney, Agent, or Firm—Harness, Dickey & Pierce

[57] ABSTRACT

A method of preparatory processing of mussles. The mussles are placed in an inner container which is positioned inside an outer container. The inner container has perforated walls and is equipped with perforated tubes which are spaced a certain distance apart. The mussles are heated to about 85° C. inside the container while being maintained in compacted condition whereby they will be able to open to a minimum extent only. The mussles are then cooled and dry-frozen individually. The cooking (processing) liquid may be frozen in cubes, blocks or the like. The liquid is then used in the final preparation of the mussles prior to their consumption.

11 Claims, 1 Drawing Figure

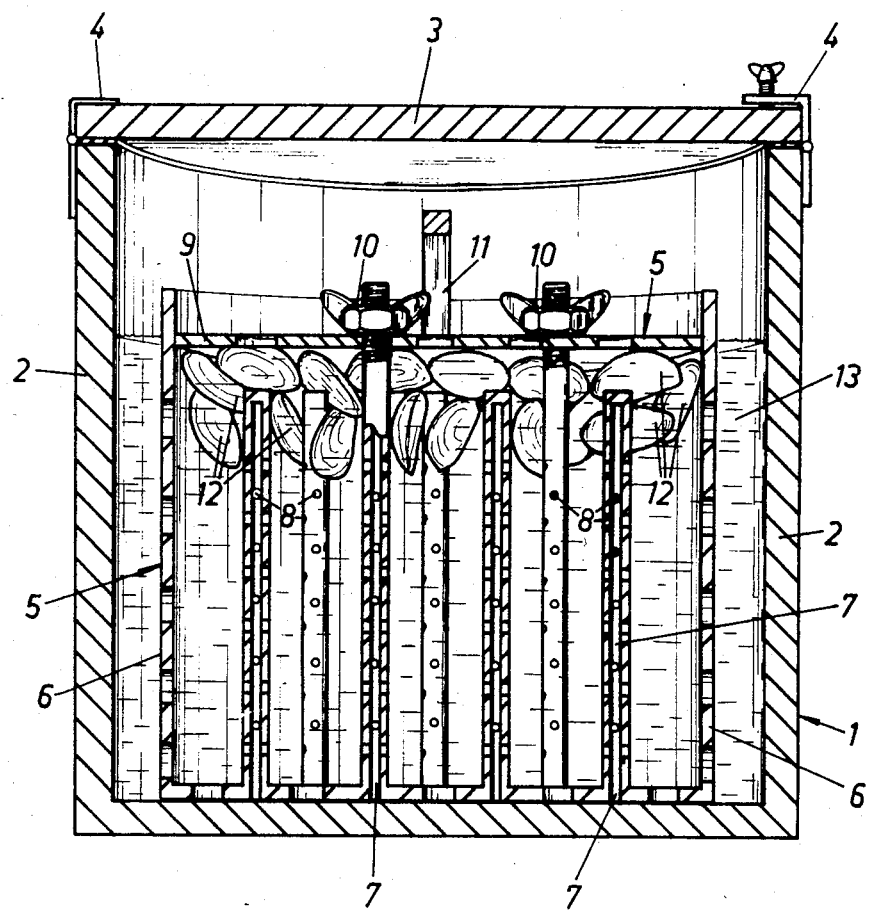

ethod of Processing Mussles

This application is a continuation of application Ser. No. 491,975, filed May 5, 1983, now abandoned.

BACKGROUND OF THE INVENTION

The subject invention concerns a method of preparatory processing of mussles and an apparatus to perform the method. The preparatory processing of the mussles allows them to be stored until their final preparation and consumption.

In the processing of mussles it is important to ensure that the taste and flavour of the mussles are retained as much as possible. The substances providing the flavour and taste are largely contained in the closed-shell mussle and in the enclosed sea-water. When the mussle is cooked, i.e. when it is heated through boiling, it is affected by the heat and as a result it opens, and the enclosed sea-water escapes and with it some of the flavour.

The subject invention concerns a method of preparatory processing of mussles, the processing method being devised to ensure that only a minimum amount of the natural taste and flavour of the mussles is lost. The method in accordance with the invention also has for its purpose to facilitate the final preparation of the mussles prior to consumption.

SUMMARY OF THE INVENTION

To achieve these purposes the method in accordance with the invention is characterised by the steps of heating the mussles in their shells in juice/water up to the point when they tend to open, compacting the mussles throughout the entire heating process by applying an external pressure thereon, thus at least partially preventing the mussles from opening, and, when the heating process is completed, cooling the mussles and removing the juice, thereafter deepfreezing the mussles and releaving the external pressure on the mussles to stop the compacting action thereon.

Further characteristics of the method in accordance with the invention as well as of the apparatus designed to perform the method will appear from the dependent claims and the parallel apparatus claim.

BRIEF DESCRIPTION OF THE DRAWINGS

The invention will be described in closer detail in the following with reference to the accompanying drawings, wherein the drawing FIGURE shows in a cross-sectional view an apparatus for performing the method in accordance with the invention.

DETAILED DESCRIPTION OF A PREFERRED EMBODIMENT

The apparatus for performing the method in accordance with the invention comprises an outer container 1. As shown on the drawing FIGURE the container may be an autoclave or other type of pressurized cooking vessel. It therefore has solid walls 2 and a sealable but removable lid 3 which may be fastened with the aid of fastening members 4.

An inner container 5 is designed to be placed inside the external container 1. The inner container has perforated walls 6. A number of tubes 7 extend from the bottom of the inner container 5 and vertically upwards. The walls of the tubes 7 are provided with apertures 8.

The tubes 7 are equally distributed in the inner container 5 and are mutually spaced apart by app. 20 cm. Some of the tubes are slightly longer than the rest and project above the edge of the walls of the inner container. At their upper ends these longer tubes are provided with threads. A lid 9 is applied over the inner container and the longer tubes 7 then project through and above the lid through openings formed therein. The lid is pressed down by nuts, preferably winged nuts 10. The lid (or alternatively, the inner container itself) is provided with a handle 11 to allow the inner container 5 to be lifted easily.

The method of processing the mussles 12 is performed in the following manner. Mussles 12 are filled into the inner container 5 and the latter is lowered into the outer container 1, the latter having previously been filled with a certain amount of liquid in the form of juice/water 13. For the sake of simplicity, the drawing shows only the uppermost layers of the mussles. The lid 9 of the inner container has previously been placed in position and tightened with the aid of the winged nuts 10, whereby the mussles are compacted which prevents them from opening. The outer container lid 3 is secured by means of the fastening members 4, thus ensuring that the autoclave is tightly sealed. The juice 13 is heated to a temperature of appr. 85° C. in the closed autoclave. Because the mussles are packed tightly together only very few mussles are able to open and therefore only a minimum amount of their flavour will escape from the mussles 12 while they are being processed.

The mussles 12 contain some air and consequently they will float upwards. However, the lid 9 will prevent them from floating above the water level. Heated juice and/or water and vapour, if any, flow into the inner container 5 through the pipes 7 and the apertures 8 therein. Thanks to the even distribution of the tubes 7 the mussles 12 will be evenly and uniformly heated. When the heating of the mussles as part of their preparatory processing is completed, that is at 85° C., the mussles, still in their tightly-packed condition, will be left to cool. After drainage, the mussles 12 inside the inner container are deepfrozen while still contained therein. Owing to this drainage arrangement it will be possible to remove the desired number of the frozen mussles one by one when they are to be consumed. The consumer therefore is at liberty to use any amount of mussles he choses and is not restricted to a definite amount, as is the case when prior-art methods are used. The juice from the cooking stage is reserved and retained in a separate container and subsequently deepfrozen, preferably in cubes or blocks. Before freezing, flavouring may, if desired, be added to the juice.

The container 5 is opened when the mussle meat is frozen and the mussles are removed from the container, frozen and easily separable, that is, frozen individually.

The heating step of this preparatory processing method is continued until the mussles tend to open. The mussles will remain in this condition during the subsequent deepfreezing operation. When they are thawed and, in connection therewith, they are exposed to the final preparation prior to consumption the mussles will open exactly in the same way as fresh mussles do.

Mussles processed in accordance with the method of the subject invention will retain most of their natural taste and flavour. The processing juices are also reserved, which means that no flavour is lost. The final preparation of the mussles prior to consumption may consist of boiling the thawed mussles in the thawed juice.

The method of freezing the mussles individually as well as of freezing their juices separately in units of easily measurable quantities makes it possible, when the mussles are to be finally prepared prior to consumption, to use exactly the desired number of mussles and an amount of juice that is the exactly correct one for the number of mussles chosen.

An important advantage inherent in the method in accordance with the invention is that is allows mussles to be processed in an efficient manner on a large scale while the mussles thus processed may be thawed on a small scale, e.g. to be finally prepared for a meal. The freezing of the mussles individually means that the freezing and the final preparation of the mussles are not interdependent as regards quantities. In other words, it is quite possible to remove from the storing container exactly the amount of the individually frozen mussles required at any particular time.

The method in accordance with the invention also includes separate freezing of the juice in which the mussles have been cooked. Consequently, the amounts of the juice to be frozen likewise may be adapted according to wish. In this manner the thawing times may be adjusted and, when small units of juice are frozen, e.g. in cubes, be very brief.

The juice could be concentrated as desired and thus the same taste be obtained with smaller quantities of juice. This allows a reduction of the total weight, which is an important consideration in freezing, cold-storage and transport.

In addition, the juice may be diluted and used for the production of ready-made mussle soup without any particular additives being necessary.

The embodiment of the invention described above is to be regarded as one example only and a number of modifications are possible within the scope of the appended claims. The design of details, such as the manner of securing the lid 9 onto the inner container, may be performed in a number of ways within the scope of the invention. Channels or other through-passages may be provided between the bottom walls of the containers 1 and 5 to facilitate through-flow of water and vapour.

The freezing may also be performed by initially freezing the mussles 12 individually in drained condition and thereafter dipping them into the juice. In this manner, the mussles are "glazed" and a thin film of frozen juice is formed on the exterior face of the mussles. The mussles are then stored and packed, glazed and in individually frozen condition. In the final preparation of the mussles, this layer of juice may be sufficient to make up the required cooking juice. The advantage of this method is that the fatty substances of the mussles are protected against the effects of the oxygen of the air.

The heating temperature, indicated in the aforegoing to appr. 85° C., obviously must be adjusted to the mussles and their properties, for depending on where and under what conditions the mussles have been cultivated their properties may vary, with the result that the adequate temperatures for heating the mussles may vary accordingly.

We claim:

1. An improved method of preparatory processing and storage of mussles, comprising the steps of heating said mussles in their shells in the presence of a liquid up to a point when they tend to open, compacting said mussles by the application of an external pressure throughout the entire heating process, the external pressure being sufficient to prevent all but a few of said mussles from opening, and when said heating process is completed, cooling said mussles sufficiently that they no longer tend to open in the absence of the external pressure and relieving said external pressure on said mussles to stop the compacting action when the mussles have cooled.

2. An improved method as claimed in claim 1, comprising performing said heating process in an autoclave.

3. An improved method as claimed in claim 1 further including the step of freezing the mussles after they have been cooled.

4. An improved method as claimed in claim 3 comprising dipping the individually frozen mussles in liquid, whereby the mussles are glazed in a film of frozen liquid forming externally on said mussles.

5. An improved method as claimed in claim 1 comprising reserving the liquid from the processing of said mussles, and freezing said reserved liquid separately.

6. An improved method as claimed in claim 1 wherein the mussles are restrained by compacting a group of mussles.

7. An improved method as claimed in claim 6 further including freezing the mussles after they have been cooled.

8. An improved method as claimed in claim 7 wherein the mussles are frozen while they are compacted.

9. An improved method as claimed in claim 1 further including the step of removing the liquid and subsequently freezing the mussles.

10. An improved method as claimed in claim 9 wherein the mussles are restrained by compacting a group of mussles.

11. An improved method as claimed in claim 10 further including freezing the mussles after they have been cooled.

* * * * *